C. NEVIN.
SIGNAL ACTUATING DEVICE FOR MOTOR VEHICLES.
APPLICATION FILED SEPT. 9, 1915.

1,264,544.

Patented Apr. 30, 1918.

Inventor.
Charles Nevin.
by Wilhelm & Parker
Attorneys.

UNITED STATES PATENT OFFICE.

CHARLES NEVIN, OF BUFFALO, NEW YORK.

SIGNAL-ACTUATING DEVICE FOR MOTOR-VEHICLES.

1,264,544.  Specification of Letters Patent.  Patented Apr. 30, 1918.

Application filed September 9, 1915. Serial No. 49,766.

*To all whom it may concern:*

Be it known that I, CHARLES NEVIN, a citizen of the United States, residing at Buffalo, in the county of Erie and State of New York, have invented a new and useful Improvement in Signal-Actuating Devices for Motor-Vehicles, of which the following is a specification.

This invention relates to means arranged on a steering wheel of a motor vehicle for controlling an electric circuit to actuate a signal, such for example as an electric horn.

The object of the invention is to produce a switch or circuit controlling device which is so arranged on the steering wheel of the vehicle that it can be actuated at any portion of the rim of the wheel without making it necessary for the operator to remove his hand or fingers from the steering wheel or to shift his hand along the rim of the steering wheel, so that no time need be lost in actuating the signal.

Figure 1:
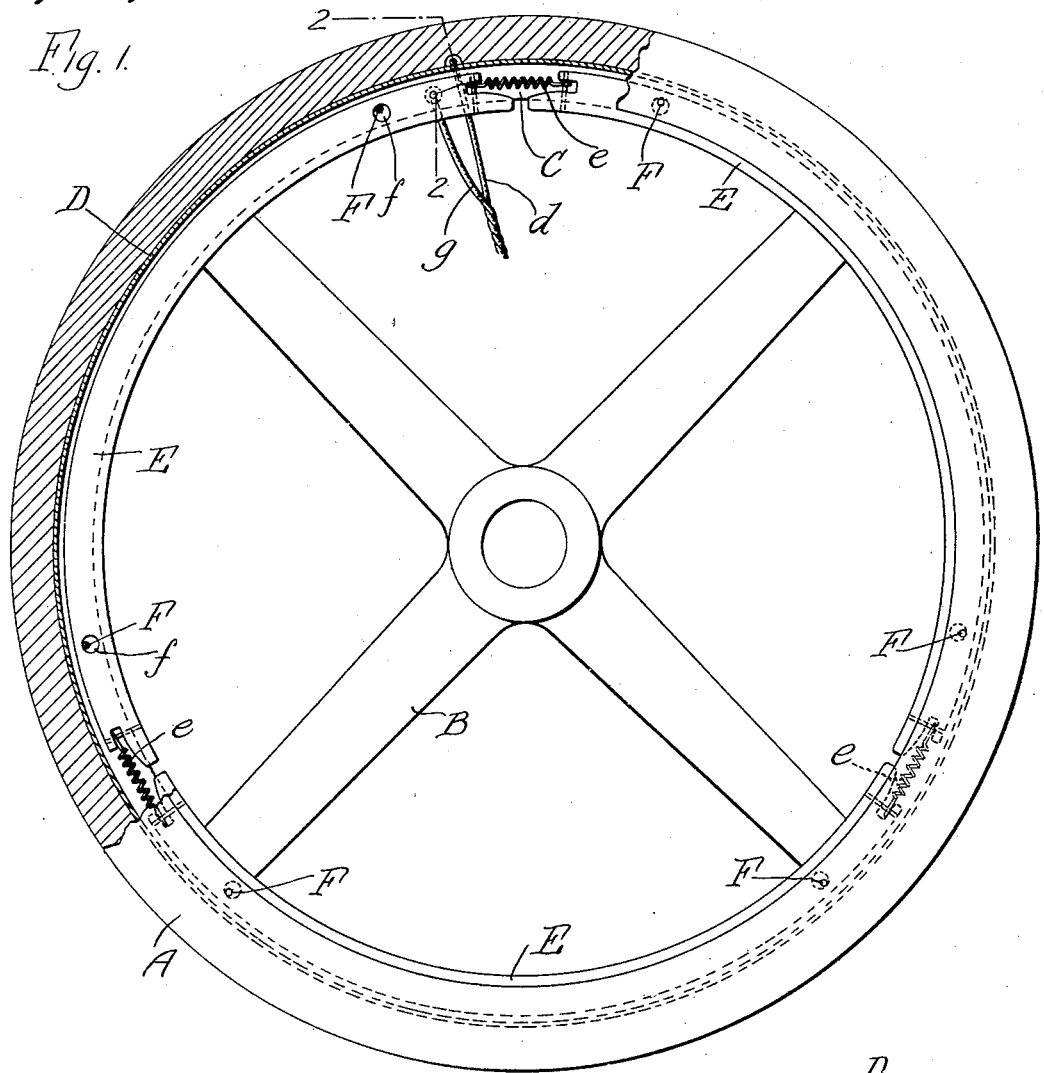
Figure 1 is a face view, partly in section of a steering wheel having the circuit controlling device embodying the invention mounted thereon.
Figure 2:
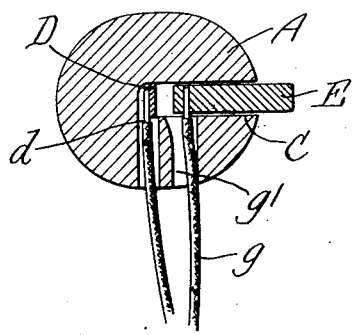
Fig. 2 is a section of the rim of the steering wheel and of the circuit controlling device on line 2—2, Fig. 1.
Figure 3:
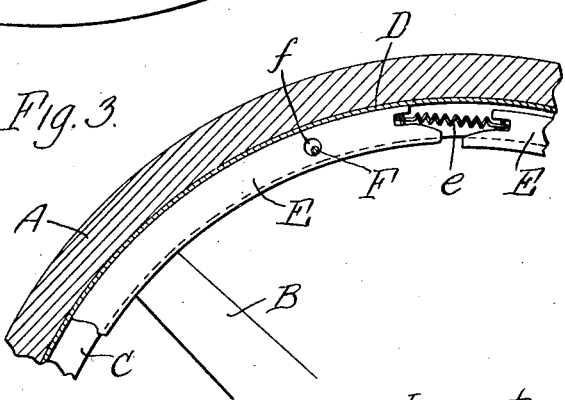
Fig. 3 is a fragmentary sectional view thereof similar to Fig. 1, showing the controlling device in position to close the circuit.

Briefly stated, the circuit controlling device embodying the invention disclosed in the drawings comprises two contact members or rings mounted on the steering wheel in such a manner that one of the members is grasped by the hand of the driver in taking hold of the rim of the steering wheel, and is so mounted that it can be moved into contact with the other member for completing a circuit to actuate the signal by pressure of the hand of the driver.

The steering wheel or device may be of any suitable construction, that shown comprising a rim A of wood or other non-conducting material which is secured to spokes B of the wheel. The rim of the wheel in the construction shown is provided with a slot or groove C which preferably extends into the rim from the inner edge thereof. A contact ring or member D of conducting material is secured in the bottom of the groove and is connected with a conductor $d$ which constitutes a part of the circuit.

The movable contact member of the circuit controlling device in the construction shown, is made of conducting material and comprises a plurality of segments E which are arranged in the form of a circle and in close proximity to the fixed ring or member D, and which are slidable in the slots into and out of engagement with the fixed member D. The adjacent ends of the segments are connected by means of springs $e$ which tend to draw the segments toward each other and thus contract the circle or ring formed by the segments E, so that the segments are yieldingly held out of contact with the fixed ring or member D. The segments are confined in the slot C by means of pins F secured in the rim of the steering wheel and extending through the slot therein and through holes or guide slots $f$ in the segments E. These holes are so formed as to permit the segments to move into contact with the fixed contact member D and also serve to limit the movement of the segments out of the slot in the rim. The segments preferably extend slightly out of or beyond the slots when in their normal or open circuit positions, so that they can be readily pressed into the slots to close the circuit. A conductor $g$ forming a part of the circuit is connected with one of the segments and current is transmitted to the other segments by means of the springs $e$ connecting the segments. The conductor in the construction shown passes through a hole $g'$ in the rim of the steering wheel.

The segments of the movable contact member are so arranged that they are always accessible at any part of the rim of the steering wheel. In the use of the device, the driver of the vehicle grasps the rim of the steering wheel in such a manner that very little or no pressure is placed on the movable contact member. When it is desired to actuate a signal, the driver can then exert pressure on the movable member without changing the position of his hand and regardless of the position of the steering wheel. Considerable time can thereby be saved in the actuation of the signal, and while actuating the signal, the driver still has the full use of both hands for steering the vehicle.

I claim as my invention:—

1. The combination of a steering wheel, of a fixed contact member secured thereon and extending substantially concentric therewith, a movable contact member arranged substantially concentric with said fixed contact member in proximity thereto and adapted to be grasped by the hand of the driver when holding the wheel, means for yieldingly holding said movable member out of contact with said fixed member, and an electric circuit with which said fixed and movable contact members are connected and which is closed when said members are pressed into contact.

2. The combination with the rim of a steering wheel, of a fixed annular contact member embedded in said rim, an annular contact member mounted on said rim in position to be grasped by the hand of an operator when holding the steering wheel and movable into said rim into engagement with said fixed contact, and a circuit which is closed when any portion of said movable contact member is pressed into said rim into engagement with said fixed contact member.

3. The combination with the rim of a steering wheel, of a substantially annular movable contact member arranged in a slot in said rim and extending out of said slot in a position to be grasped by the hand of an operator driving the car, and a contact member arranged in said slot and adapted to be engaged by said movable member to close a circuit when said movable member is pressed into said slot.

4. The combination of a steering wheel having a rim provided with a circumferential slot, a fixed contact member secured in said slot, an annular movable contact member arranged within said slot and slidable therein into and out of contact with said fixed member, said movable member extending out of said slot and adapted to be pushed into the slot to contact with said fixed member, and an electric circuit with which said members are connected and which is closed when said members contact.

5. The combination with an electric circuit, of a steering wheel having a rim provided with a circumferential slot, a fixed contact member secured in said slot and connected with the electric circuit, an annular movable contact member arranged in said slot and slidable into and out of contact with the fixed member, said movable member being connected with an electric circuit, means for normally holding said movable member out of contact with said fixed member, and means in said slot for limiting the movement of said movable member in said slot.

6. The combination with the rim of a steering wheel, of a fixed contact ring extending circumferentially around said rim and secured thereto, a contractible contact ring arranged in proximity to said fixed ring and means for limiting the movement of the contractible ring.

7. The combination with the rim of a steering wheel, of a fixed contact member extending circumferentially around said rim, and secured thereto, a movable contact member arranged in proximity to said fixed member and comprising a plurality of segments having their adjacent ends connected by springs, and guide means for limiting the movement of said segments.

8. The combination with the rim of a steering wheel, of a fixed contact member extending circumferentially around said rim and secured thereto, a movable contact member arranged in proximity to said fixed member and comprising a plurality of segments, springs for normally holding the movable member out of contact with said fixed member, and means for limiting the movement of said segments and for guiding the same toward and from said fixed member.

9. The combination with an electric circuit, of a steering wheel having a rim provided with a circumferential slot, a fixed contact member secured in said slot and connected with the electric circuit, a movable contact member arranged in said slot and comprising a plurality of segments slidable into and out of engagement with said fixed member, springs connecting the adjacent ends of said segments and yieldingly holding the segments out of contact with said fixed member, and means in said slot for guiding the segments in their movements.

10. The combination with an electric circuit, of a steering wheel having a rim provided with a circumferential slot, a fixed contact ring secured in said slot and connected with said circuit, a contractible contact ring comprising a plurality of segments connected at their adjacent ends by springs and arranged in proximity to said fixed ring, and means for guiding the segments into and out of contact with said fixed ring, said segments being connected with said circuit and having parts extending beyond the slot to facilitate the moving of said segments into contact with a fixed ring.

11. The combination with the rim of a steering wheel, of a fixed contact member embedded in a slot in said rim, an annular member mounted in said slot and movable into the same, a circuit adapted to be closed by moving said movable member into said slot, means within said slot for normally holding said movable member in its outer position in which said circuit is open, and means arranged within said slot for limiting the movement of said annular member.

12. The combination with the rim of a steering wheel, of a substantially annular movable contact member arranged in a slot in said rim and having an associated part extending out of said slot in a position to be grasped by the hand of an operator driving the car, and a contact member arranged in said slot and adapted to be engaged by said movable member to close a circuit when said movable member is pressed into said slot.

13. The combination of a steering wheel having a rim provided with a circumferential slot, a fixed contact member secured in said slot, an annular movable contact member having an associated part arranged within said slot and slidable therein into and out of contact with said fixed member, said movable member extending out of said slot and adapted to be pushed into the slot to contact with said fixed member, and an electric circuit with which said members are connected and which is closed when said members contact.

14. The combination with an electric circuit, of a steering wheel having a rim provided with a circumferential slot, a fixed contact member secured in said slot and connected with the electric circuit, an annular movable contact member arranged in said slot and slidable into and out of contact with the fixed member, said movable member being connected with an electric circuit, means for normally holding said movable member out of contact with said fixed member, and means in said slot for limiting the movement of said movable member in said slot.

Witness my hand this 1st day of Sept., 1915.

CHARLES NEVIN.

Witnesses:
F. E. PROCHNOW,
MILDRED J. PITMAN.